(12) United States Patent
Eitel et al.

(10) Patent No.: US 12,279,226 B2
(45) Date of Patent: Apr. 15, 2025

(54) COMMUNICATION DEVICE AND METHOD

(71) Applicant: Sony Semiconductor Solutions Corporation, Kanagawa (JP)

(72) Inventors: Ben Eitel, Stuttgart (DE); Thomas Handte, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 417 days.

(21) Appl. No.: 17/779,135

(22) PCT Filed: Nov. 26, 2020

(86) PCT No.: PCT/EP2020/083511
§ 371 (c)(1),
(2) Date: May 24, 2022

(87) PCT Pub. No.: WO2021/110534
PCT Pub. Date: Jun. 10, 2021

(65) Prior Publication Data
US 2023/0007617 A1     Jan. 5, 2023

(30) Foreign Application Priority Data

Dec. 6, 2019 (EP) .................................... 19214092
Feb. 19, 2020 (EP) .................................... 20158305

(51) Int. Cl.
  *H04W 64/00* (2009.01)
  *H04B 17/309* (2015.01)
  *H04L 5/00* (2006.01)
(52) U.S. Cl.
  CPC ........ *H04W 64/003* (2013.01); *H04B 17/309* (2015.01); *H04L 5/0048* (2013.01)

(58) Field of Classification Search
None
See application file for complete search history.

(56) References Cited

U.S. PATENT DOCUMENTS

| 5,499,032 A | 3/1996 | Kelley et al. |
| 2008/0310459 A1* | 12/2008 | Date ..................... H04J 3/0676 370/503 |

(Continued)

FOREIGN PATENT DOCUMENTS

GB        2513211 A    10/2014

OTHER PUBLICATIONS

International Search Report and Written Opinion mailed on Feb. 16, 2021, received for PCT Application PCT/EP2020/083511, Filed on Nov. 26, 2020, 9 pages.

(Continued)

*Primary Examiner* — Frantz Bataille
(74) *Attorney, Agent, or Firm* — XSENSUS, LLP

(57) ABSTRACT

Communication device comprising circuitry configured to measure a first phase of a first measurement signal transmitted by a first node to a second node, measure a second phase of a second measurement signal transmitted by the second node to the first node, repeat the measurements of the first and second phases one or more times, receive phase information from the first node and/or the second node, the phase information including third phase information acquired by the second node from measurements of a third phase of the first measurement signals and/or fourth phase information acquired by the first node from measurements of a fourth phase of the second measurement signals, and estimate a distance difference using the measured first and second phases and the received phase information.

20 Claims, 12 Drawing Sheets

(56) References Cited

U.S. PATENT DOCUMENTS

2009/0322603 A1   12/2009  Liao
2019/0187262 A1*  6/2019  Moe ...................... G01S 13/825
2019/0268725 A1   8/2019  Edge et al.

OTHER PUBLICATIONS

Sony Corporation, "Method and System for Determining a Location of a Client Device, Client Device and Network Device", Witte, Weller & Partner, 4727P263EP, Related Case I-15-045-EP-FFWF, Jun. 25, 2015, pp. 1-33.

Gustafsson et al., "Positioning Using Time-Difference of Arrival Measurements", Acoustics, Speech, and Signal Processing, 1988. ICASSP-88., vol. 6, May 2003, 4 pages.

Haartsen et al., "Narrowband RF Distance Measurement Using Phase Locked FM Transceivers", Computer Science Bibliography, SCVT, 2016, pp. 1-6.

Gunia et al., "Setting up a Phase-Based Positioning System using Off-the-Shelf Components", 2017 14th Workshop on Positioning, Navigation and Communications (WPNC), 2017, pp. 1-6.

Pelka et al., "Indoor Localization based on Bi-Phase Measurements for Wireless Sensor Networks", 2015 IEEE Wireless Communications and Networking Conference (WCNC): Track 3: Mobile and Wireless Networks, 2015, pp. 1362-1367.

Pelka et al., "Accurate Radio Distance Estimation by Phase Measurements with Multiple Frequencies", 2014 International Conference on Indoor Positioning and Indoor Navigation, Oct. 27-30, 2014, pp. 142-151.

Kulge et al., "Ranging with IEEE 802.15.4 Narrow-Band PHY", Project: IEEE P802.15 Working Group for Wireless Personal Area Networks (WPANs), IEEE 802.15-09-0613-00-004f, Sep. 14, 2009, 15 pages.

* cited by examiner

COMMUNICATION DEVICE AND METHOD

CROSS-REFERENCE TO RELATED APPLICATIONS

The present application is based on PCT filing PCT/EP2020/083511, filed Nov. 26, 2020, which claims priority to EP 19214092.9, filed on Dec. 6, 2019, and claims priority to EP 20158305.1, filed on Feb. 19, 2020, the entire contents of each are incorporated herein by reference.

BACKGROUND

Field of the Disclosure

The present disclosure relates to a communication device and a corresponding communication method.

Description of Related Art

Communication standards such as ZigBee or Bluetooth use narrow-band signals (having, for instance, a bandwidth of approximately 1 MHz) for wireless data transmission. Despite low time resolution of narrow-band signals, quite accurate distance estimation between two nodes can be achieved by applying phase difference measurements, e.g. using two-way ranging. To combat multipath effects and measurement noise, typically multiple (e.g. hundreds of) measurements at different frequencies and averaging over time are applied to improve the ranging accuracy. Ranging results between a mobile node and at least three different fixed anchor nodes (hereinafter also called "nodes") can be used to estimate the location of the mobile node (hereinafter also called "communication device").

Known methods, as e.g. disclosed in M. Gunia et. al. (University of Dresden), Setting up a phase-based positioning system using off-the-shelf components, WPNC 2017 or J. C. Haartsen et. al., Narrowband RF distance measurement using phase locked FM transceivers, SCVT 2016 scale badly with increasing number of communication devices as each communication device needs to establish a bidirectional communication with at least three nodes to obtain a 3D position estimate. Moreover, the longer the duration of each bidirectional ranging communication, the better the ranging and/or position estimate gets. Considering today's highly congested ISM bands (especially at 2.4 GHz) and typically required position accuracies below 1 m, reliable continuous positioning based on conventional phase difference ranging is only suitable for a few communication devices at the same time. Moreover, privacy cannot be guaranteed for the communication device owner, due to the required communication with nodes installed at the premises. Still further, the continuous signal transmissions also drain the battery of the communication device.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide a communication device that allows more communication devices to perform phase difference ranging to obtain information about their position, at the same time respective privacy of the users of the communication devices.

It is a further object to provide a corresponding communication method as well as a corresponding computer program for implementing said method and a non-transitory computer-readable recording medium for implementing said method.

According to an aspect there is provided a communication device comprising circuitry configured to measure a first phase of a first measurement signal transmitted by a first node to a second node, measure a second phase of a second measurement signal transmitted by the second node to the first node, repeat the measurements of the first and second phases one or more times, receive phase information from the first node and/or the second node, said phase information including third phase information acquired by the second node from measurements of a third phase of the first measurement signals and/or fourth phase information acquired by the first node from measurements of a fourth phase of the second measurement signals, and estimate a distance difference using the measured first and second phases and the received phase information, said distance difference representing the difference between a first distance between the communication device and the first node and a second distance between the communication device and the second node.

According to a further aspect there is provided a corresponding communication method.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication device and as defined in the dependent claims and/or disclosed herein.

One of the aspects of the disclosure is to overcome the limitations of the known communication devices and methods using conventional phase difference ranging by avoiding the bidirectional communication between the communication device and the nodes. Instead, the presented communication device just listens to the bidirectional ranging communication (i.e., the first and second measurement signals) of node pairs. Phase measurements are used to estimate the difference in distance between the communication device and the node pair. Multiple of these measurements, as performed according to a preferred embodiment, allow for hyperbolic positioning to determine the (absolute or relative) position of the communication device.

The measurements of the first and second phases can be repeated one or more times for averaging purpose to obtain a better estimate of the first phase and the second phase. Measurements at a second frequency may be used to increase the unique distance difference estimation range. Further, multiple measurements at the same frequency may be used to reduce the impact of noise. Still further, measurements at multiple frequencies may be used to reduce the impact of multipath effects.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
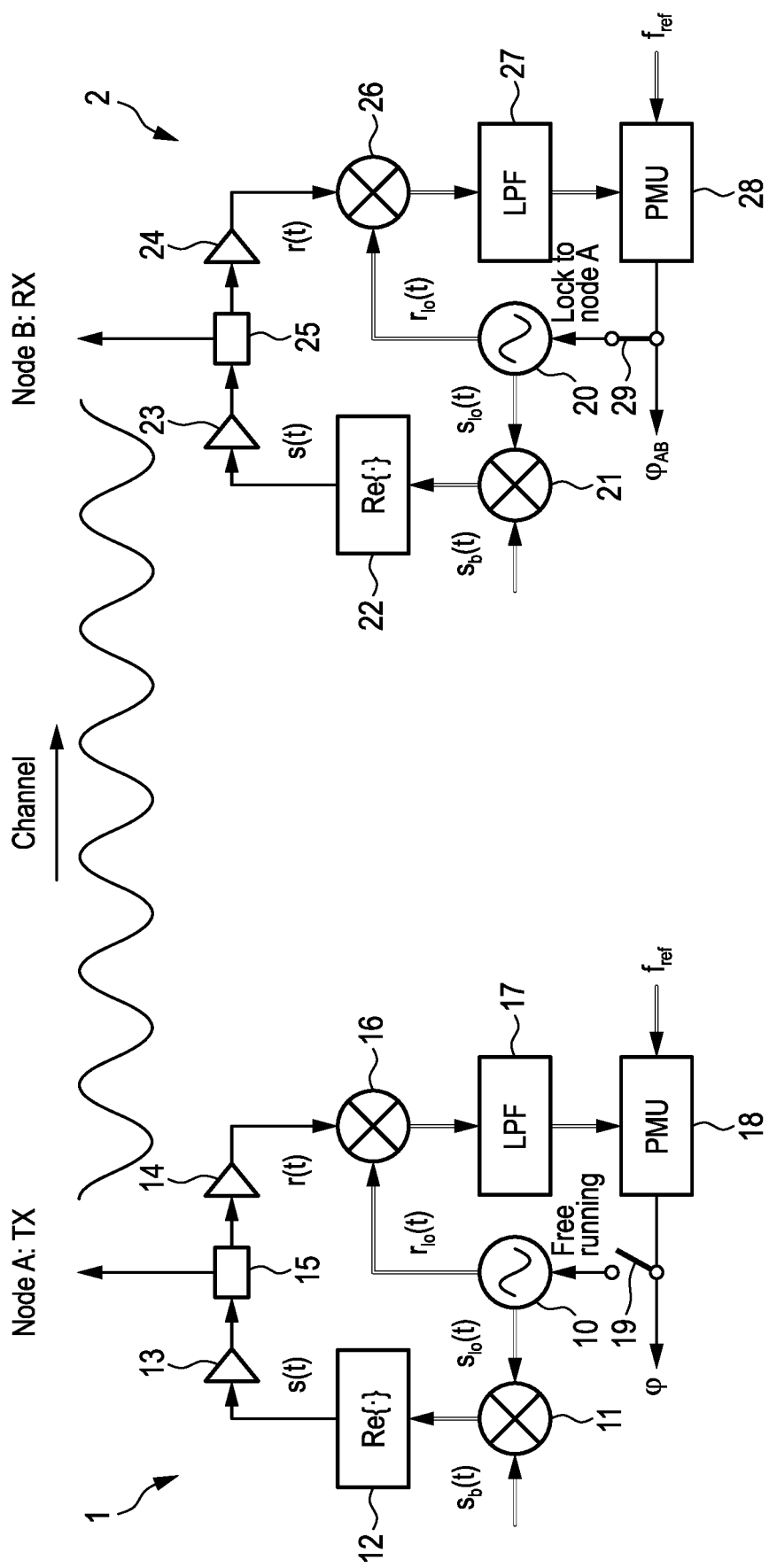
FIG. 1 shows a schematic diagram of a known one-way ranging setup.

In the following, a short mathematical derivation will first be provided to better understand why phase differences are needed and how phase information can be obtained that allows for scalable ranging even with free running oscillators at each node. Unknown parameters are highlighted in bold. The considered communication setup is depicted in FIG. 1, wherein only the blocks with grey background color are active.

The transmitter 1 (also called node A) may e.g. be a mobile communication device such as a smartphone. The receiver 2 (also called node B) may e.g. be stationary communication device such as an anchor.

As baseband signal $s_b(t)$ a low IF tone with frequency $f_b$ and unknown phase $\varphi_b$ shall be considered. $\varphi_b$ can assumed to be constant within the complete measurement cycle as its wavelength is much larger compared to the local oscillator wavelength.

$$s_b(t) = e^{j(2\pi f_b t + \varphi_b)} \quad (1)$$

For the local oscillator signal $s_{lo}(t)$ of the local oscillator 10 a fundamental frequency $f_0$, changeable in frequency steps by $nf_h$ with integer n and unknown phase $\varphi_{slo}(n, t)$ shall be considered. In practical implementations, $\varphi_{slo}$ may change notably if a frequency step is applied. But also without applying frequency steps $\varphi_{slo}$ slowly changes over time due to clock drift.

$$s_{lo}(t) = e^{j(2\pi(f_0 + nf_h)t + \varphi_{slo}(n,t))} \quad (2)$$

The transmit signal s(t) at carrier frequency $f_c$ is generated by multiplying $s_b(t)$ with $s_{lo}(t)$ by a multiplier 11 and taking the real part by a real part extraction unit 12. The unknown $K_s$ represents the transmit signal gain.

$$s(t) = Re\{s_{lo}(t)s_b(t)\} = K_s \cos(2\pi(f_0 f_b + nf_h)t + \varphi_{slo}(n,t) + \varphi_b) \quad (3a)$$

$$f_c = f_0 + nf_h + f_b \quad (3b)$$

Further elements of the transmitter 1 include amplifiers 13, 14, transmitting unit 15, multiplier 16, low pass filter (LPF) 17, phase measurement unit (PMU) 18 and switch 19.

Without loss of generality, a wireless noiseless delay channel (line of sight, no reflections) with unknown attenuation $K_r$ (includes RX gain), unknown TX/RX distance d and speed of light c shall be considered. Hence, the received signal can be formulated as $$r(t) = K_r s\left(t - \frac{d}{c}\right) \quad (4)$$

The target of ranging is to estimate d. Such a channel model is appropriate for the narrow-band signals employed.

At receiver side, r(t) is down-converted by a multiplier 21 to a desired fixed low-IF frequency $f_{if}$ using a local oscillator signal $r_{lo}(t)$ of the local oscillator 20 with frequency $f_{rlo}$ and unknown phase $\varphi_{rlo}(n, t)$. $\varphi_{rlo}$ also changes with a frequency step n at transmitter side due to the assumption of a fixed low-IF frequency $f_{if}$. Comparable to the local oscillator phase at TX side, $\varphi_{rlo}$ slowly changes over time due to clock drift.

$$r_{lo}(t) = e^{-j(2\pi f_{rlo} t + \varphi_{rlo}(n,t))} \quad (5)$$

The down-conversion is followed by a low-pass filter 27 to suppress frequencies above $f_c$, resulting in the low-IF signal $$r_{if}(t) = \frac{K_s K_r}{2} e^{j\left(2\pi(f_c - f_{rlo})t - 2\pi(f_0 + f_b + nf_h)\frac{d}{c} + \varphi_{slo}(n,t) - \varphi_{rlo}(n,t) + \varphi_b\right)} \quad (6a)$$

$$f_{if} = f_c - f_{rlo} \quad (6b)$$

Finally the phase information is extracted by means of comparing against a local reference signal with frequency $f_{ref} = f_{if}$ and unknown phase $\varphi_{ref}$ using a phase measurement unit 28. The phase measurement is also used as input to the local oscillator 20 in a phase-locked loop (PLL) fashion to synchronize the node to the received RF signal. After PLL lock and assuming $f_{rlo} \gg f_{if}$, $\varphi_{ref}$ can assumed to be constant within the complete measurement cycle. This phase comparison is comparable to a demodulation of the received low IF signal by $$r_{ref}(t) = e^{-j(2\pi f_{if} t + \varphi_{ref})} \quad (7a)$$

$$\varphi(d, n) = \arg(r_{if}(t) r_{ref}(t)) = \quad (7b)$$

$$-2\pi(f_0 + f_b + nf_h)\frac{d}{c} + \varphi_{slo}(n, t) - \varphi_{rlo}(n, t) + \varphi_b - \varphi_{ref}$$

Further elements of the receiver 2 include amplifiers 23, 24, receiving unit 25, multiplier 26, real part extraction unit 22 and switch 29.

By considering only the phase information φ(d, n) the unknowns $K_s$ and $K_r$ are already removed. Nonetheless, φ(d, n) still contains 4 unknown phases. Moreover, in (7b) the desired distance information d is multiplied by $$-2\pi \frac{\sigma_0 + nf_h + f_b)}{c} = -2\pi \frac{f_c}{c}.$$

Due to the general ambiguity of φ(d, n) in terms of multiples of 2π, d could be estimated without ambiguity only for distances up to $$d_{max} = \frac{c}{f_c}.$$

Assuming $f_c$=2.4 GHz it is obtained $d_{max}$≈12 cm. For most practical applications a much larger unique estimation range for d is mandatory.

The following state-of-the-art methods perform multiple phase measurements and compute phase differences to get rid of the unknown phases and extend the unique estimation range $d_{max}$ for d.

Figure 2:
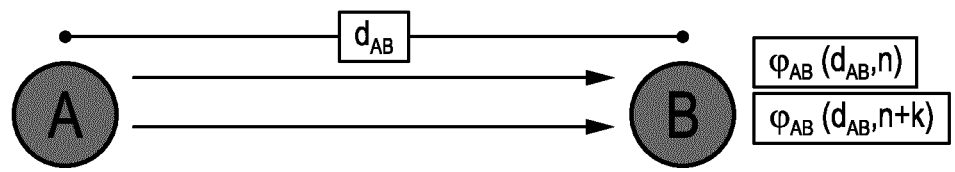
FIG. 2 shows a simplified diagram of one-way ranging phase measurements at two frequencies.

To avoid distance ambiguities at multiples of $d_{max}$=c/$f_c$, a second measurement can be applied at t̃=t+Δt with frequency step ñ=n+k, as shown in FIG. 2 that illustrates one-way ranging phase measurements at two frequencies between a node A and a node B. Taking the phase difference of the two measurements yields $$\Delta\varphi(d, n, k) = \varphi(d, n+k) - \varphi(d, n) \quad (8)$$

$$\Delta\varphi(d, n, k) =$$

$$-2\pi k f_h \frac{d}{c} + \varphi_{slo}(n+k, t+\Delta t) - \varphi_{slo}(n, t) - \varphi_{rlo}(n+k, t+\Delta t) + \varphi_{rlo}(n, t)$$

The unknown parameters $\varphi_b$ and $\varphi_{ref}$ are removed in (8) and the unique estimation range for d is extended to $$d_{max,1} = \frac{c}{kf_h}.$$

Assuming k=1 and $f_h$=1 MHz results in $d_{max,1}$≈300 m. On the other hand, due to frequency step $kf_h$ it is technically difficult to ensure that $\varphi_{slo}$(n+k, t+Δt)≅$\varphi_{slo}$(n, t) and $\varphi_{rlo}$(n+k, t+Δt)≅$\varphi_{rlo}$(n, t). Moreover, clock drift can be an issue as multiple measurements across time and frequency are typically needed to mitigate noise and multipath effects on the distance estimate resulting in an undesired large time lag Δt. The remaining issues of one-way ranging can be effectively mitigated by two-way ranging.

Figure 3:
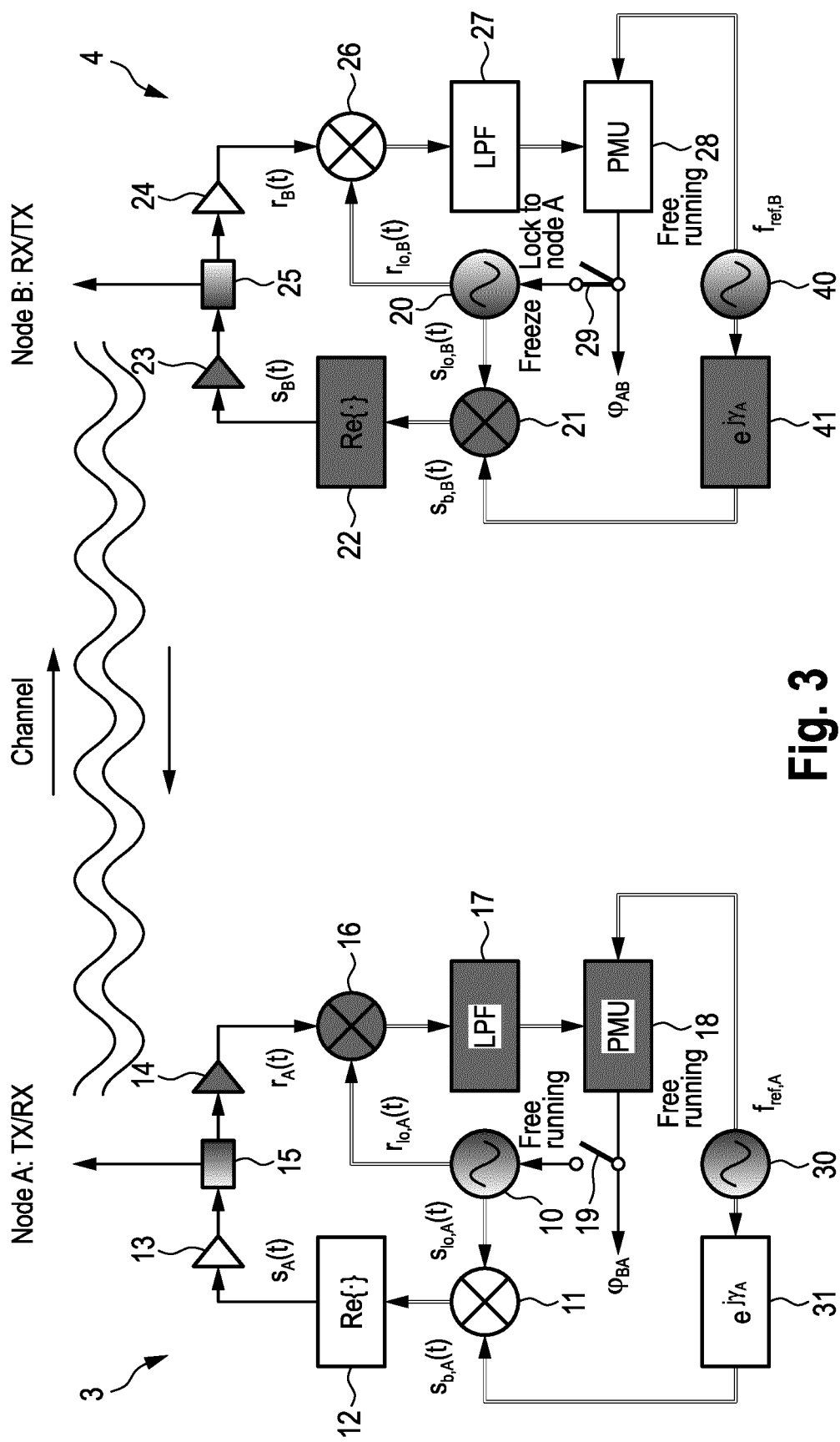
FIG. 3 shows a schematic diagram of a known two-way ranging setup.

The concept of two-way ranging is shown in FIG. 3 showing a first communication device 3 (node A) and a second communication device 4 (node B). They partly comprise the same elements as the transmitter 1 and the receiver 2 shown in FIG. 1, for which the same reference signs have been assigned. Additional elements of the first communication device 3 include a reference oscillator 30 and a modulator 31. Additional elements of the second communication device 4 include a reference oscillator 40 and a modulator 41.

In the first step (way one; switch 19 is open and switch 29 is closed), node A transmits a sinusoidal signal to node B as described by (1)-(7b). After PLL lock, the measured phase at node B is thus given by $$\varphi_{AB}(d, n) = \quad (9)$$

$$-2\pi(f_{0,A} + f_{b,A} + nf_h)\frac{d}{c} + \varphi_{slo,A}(n, t) - \varphi_{rlo,B}(n, t) + \varphi_{b,A} - \varphi_{ref,B}$$

In the second step (way two; switch 19 is open and switch 29 is open), the operation of nodes A and B is reversed. Important point is that the local oscillators 10, 20 are continuously running such that $\varphi_{rlo}$(n, t+Δt)≅$\varphi_{slo,A}$(n, t) and $\varphi_{slo,B}$(n, t+Δt)≅$\varphi_{rlo,B}$(n, t). This can be achieved by opening the phase-locked loop of node B after phase lock to freeze the oscillator frequency and executing the second step of the two-way ranging as fast as possible after the first step to minimize the time lag Δt and hence the influence of clock drift. The two-way ranging also implicitely requires that $f_{b,A}$=$f_{ref,A}$ and $f_{b,B}$=$f_{ref,B}$. As a consequence, it is obtained $$f_{0,A} + nf_h + f_{b,A} = f_{slo,A} + f_{b,A} = f_{0,B} + nf_h + f_{b,B} = f_{slo,B} + f_{b,B} = f_c(n) \quad (10)$$

The measured phase at node A is thus given by $$\varphi_{BA}(d, n) = -2\pi f_c(n)\frac{d}{c} + \varphi_{slo,B}(n, t+\Delta t) - \varphi_{rlo,A}(n, t) + \varphi_{b,B} - \varphi_{ref,A} \quad (11)$$

$$\varphi_{BA}(d, n) \cong -2\pi f_c(n)\frac{d}{c} + \varphi_{slo,B}(n, t) - \varphi_{rlo,A}(n, t) + \varphi_{b,B} - \varphi_{ref,A}$$

Figure 4:
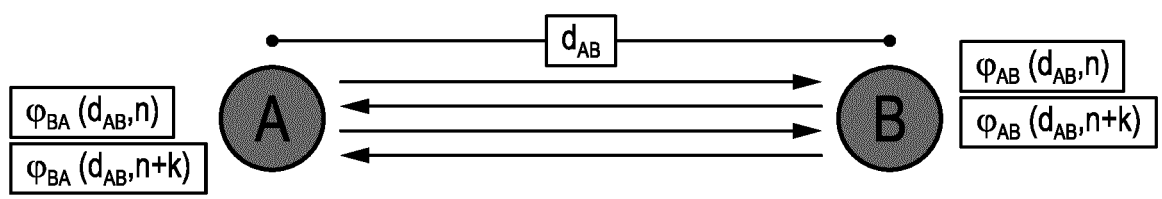
FIG. 4 shows a simplified diagram of two-way ranging phase measurements at two frequencies.

As with one-way ranging, both phase measurements (9) and (11) are repeated at frequency step n+k (as shown in FIG. 4 that illustrates two-way ranging phase measurements at two frequencies between a node A and a node B):

$$\varphi_{AB}(d, n+k) = \quad (12)$$

$$-2\pi f_c(n+k)\frac{d}{c} + \varphi_{slo,A}(n+k, t) - \varphi_{rlo,B}(n+k, t) + \varphi_{b,A} - \varphi_{ref,B}$$

$$\varphi_{BA}(d, n+k) = \quad (13)$$

$$-2\pi f_c(n+k)\frac{d}{c} + \varphi_{slo,B}(n+k, t) - \varphi_{rlo,A}(n+k, t) + \varphi_{b,B} - \varphi_{ref,A}$$

Subtraction (9) from (12) and (11) from (13), adding both phase differences and solving for d finally yields $$\varphi_{AB}(d, n+k) - \varphi_{AB}(d, n+k) + \varphi_{BA}(d, n+k) - \varphi_{BA}(d, n) = -4\pi k f_h \frac{d}{c} \quad (14)$$

$$d = -\frac{c(\varphi_{AB}(d, n+k) - \varphi_{AB}(d, n) + \varphi_{BA}(d, n+k) - \varphi_{BA}(d, n))}{4\pi k f_h}$$

Obviously, two-way ranging is an important step to remove the unknown oscillator phases and obtain accurate ranging results even though the clocks of node A and node B are not perfectly synchronized. One of the nodes must share its phase measurements (or phase difference estimate) with the other node to solve ford according to (14). Two-way ranging, however, has drawbacks: A bidirectional communication between node A and node B may be required resulting in the aforementioned limitations of the conventional solution. Further, channel congestion may be caused by the phase measurement itself.

Figure 5:
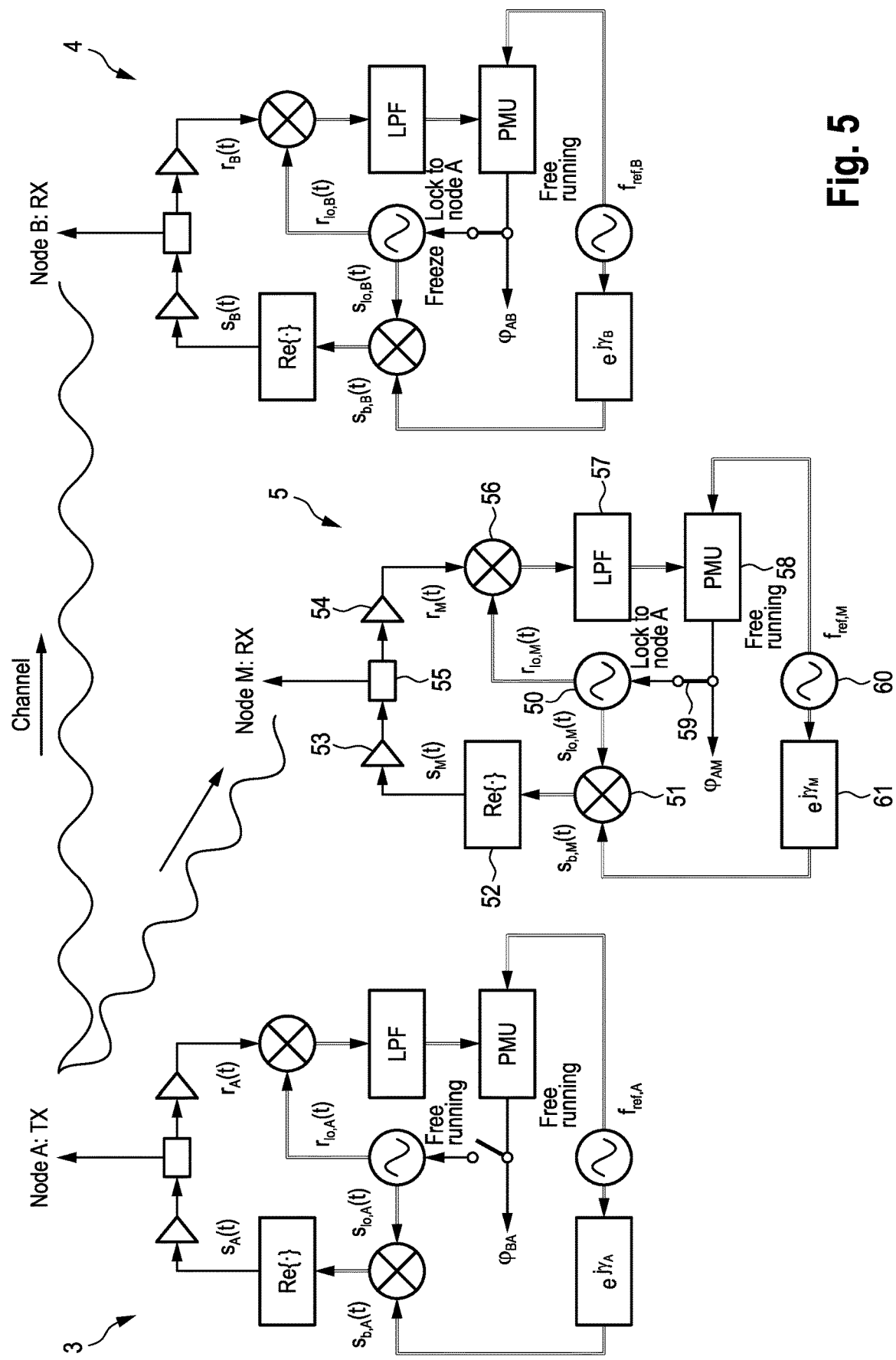
FIG. 5 shows a schematic diagram of an embodiment of scalable phase difference ranging setup according to the present disclosure in a first phase.
Figure 6:
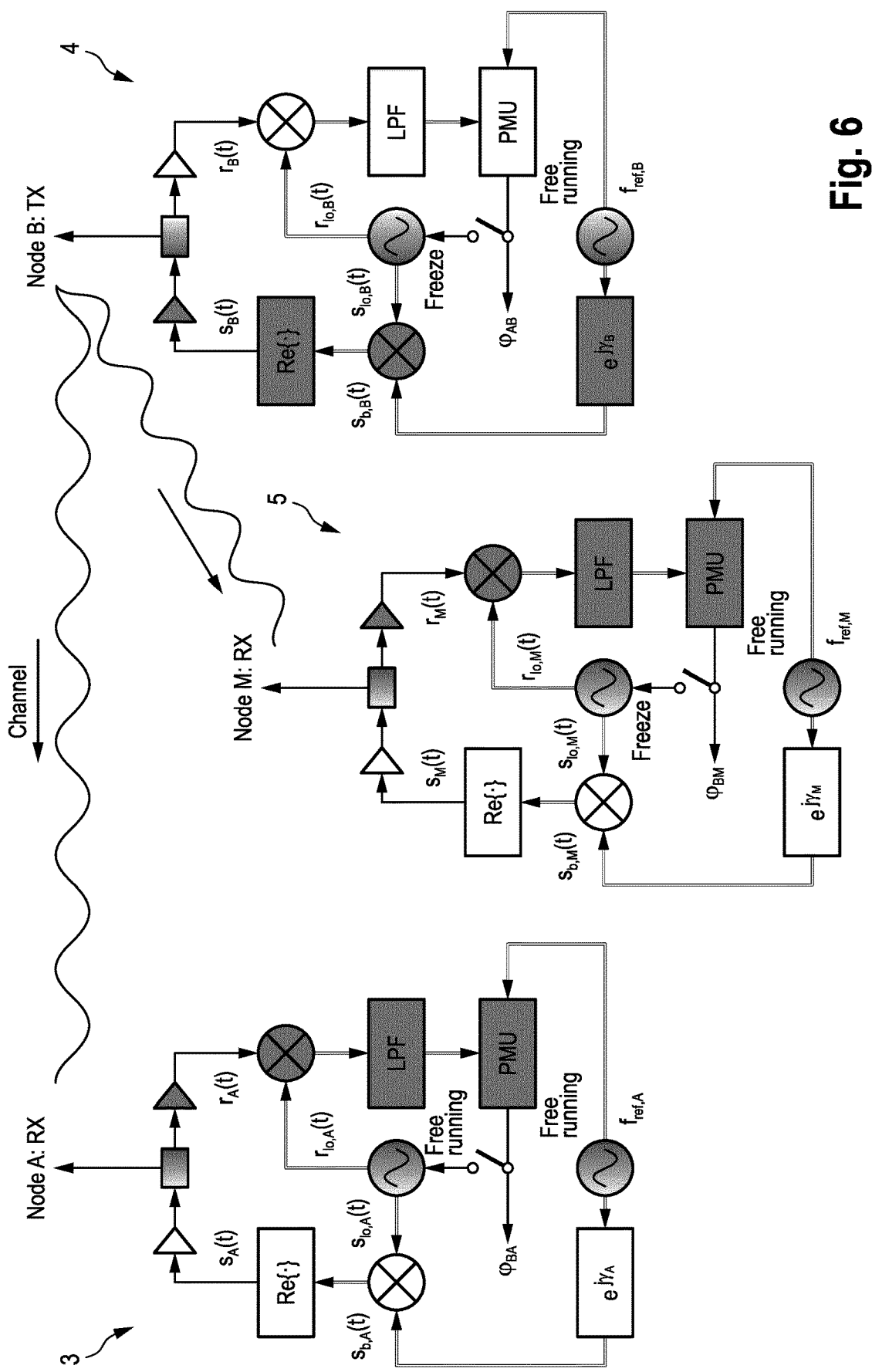
FIG. 6 shows a schematic diagram of the embodiment of scalable phase difference ranging setup shown in FIG. 5 in a second phase.
Figure 7:
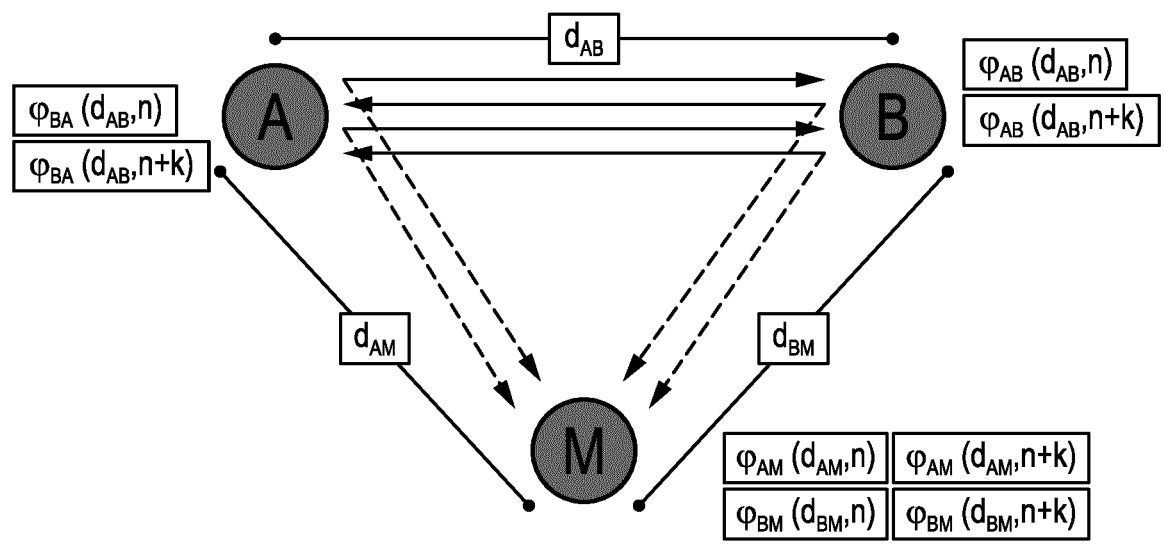
FIG. 7 shows a simplified diagram of scalable phase difference ranging phase measurements according to the present disclosure.

FIG. 5 shows a schematic diagram of an embodiment of scalable phase difference ranging setup according to the present disclosure in a first phase. FIG. 6 shows a schematic diagram of the embodiment of scalable phase difference ranging setup shown in FIG. 5 in a second phase. FIG. 7 shows a simplified diagram of scalable phase difference ranging phase measurements according to the present disclosure.

The above-described limitations of known solutions are overcome according to the present disclosure by avoiding the above-mentioned disadvantages of the conventional two-way ranging bidirectional communication between mobile node and anchor node. Instead, passive (i.e. listening mode only) nodes (e.g. mobile node M representing a third communication device 5; see FIGS. 5 to 7) synchronize to the two-way phase difference ranging procedure of anchor node pairs (e.g. node A and node B representing first and second communication devices 3, 4). The third communication device 5 substantially comprises elements 50-61 which correspond to the elements 10-19, 30, 31 of the first communication device 3 and elements 20-29, 40, 41 of the second communication device 4, respectively.

The anchor nodes A and B send all relevant synchronization information and phase measurement results by messages which are retrievable for the passive node(s) M. Based on the transmitted measurement signals of node A and node B, node M conducts own phase measurements. In an embodiment, node B may manipulate its local oscillator phase, but this is generally not possible for node A. Thus, at least node A shares its phase measurements with node M, which in such an embodiment node B may not need to share its phase measurements with node M.

In the following equations will be derived and it will be proven that by using these phase measurements and the phase measurements conducted by node A and node B, node M is able to compute a distance difference information that corresponds to a hyperbolic function. Assuming that node M listens to the two-way ranging of several anchor node pairs, hyperbolic positioning can be applied based on the obtained hyperbolic functions. Comparable to two-way ranging, the disclosed approach takes into account that in practice the nodes are not perfectly synchronized in time, i.e. each node has its own free running oscillator and a certain drift between the nodes oscillators is present.

A fundamental assumption is that the mobile node M is able to synchronize itself in time and frequency (steps) to the ranging measurements executed between anchor nodes A and B. Assuming that anchor node A (initiator/master) sends the first ranging signal at frequency step n, anchor node B and mobile node M lock their oscillators with respect to the received RF signal from anchor node A and their local reference signals. During ranging signal transmission of anchor node B, the phase-locked loops of anchor node B and mobile node M are in open loop mode to "freeze" their oscillator frequencies. In the following, it is assumed that for any node X involved in the ranging $\varphi_{slo,X}(n) = \varphi_{rlo,X}(n) = \varphi_{lo,X}(n)$, that $\Delta t \approx 0$ s, and $\tilde{n} = n+k$. With these assumptions in mind, the following phases can be measured at nodes A, B, and M:

$$\varphi_{AB}(d_{AB}, n) = -2\pi f_c(n)\frac{d_{AB}}{c} + \varphi_{lo,A}(n) - \varphi_{lo,B}(n) + \varphi_{b,A} - \varphi_{ref,B} \quad (15)$$

$$\varphi_{AM}(d_{AM}, n) = -2\pi f_c(n)\frac{d_{AM}}{c} + \varphi_{lo,A}(n) - \varphi_{lo,M}(n) + \varphi_{b,A} - \varphi_{ref,M} \quad (16)$$

$$\varphi_{BA}(d_{AB}, n) \cong -2\pi f_c(n)\frac{d_{AB}}{c} + \varphi_{lo,B}(n) - \varphi_{lo,A}(n) + \varphi_{b,B} - \varphi_{ref,A} \quad (17)$$

$$\varphi_{BM}(d_{BM}, n) \cong -2\pi f_c(n)\frac{d_{AM}}{c} + \varphi_{lo,B}(n) - \varphi_{lo,M}(n) + \varphi_{b,B} - \varphi_{ref,M} \quad (18)$$

$$\varphi_{AB}(d_{AB}, \tilde{n}) = -2\pi f_c(\tilde{n})\frac{d_{AB}}{c} + \varphi_{lo,A}(\tilde{n}) - \varphi_{lo,B}(\tilde{n}) + \varphi_{b,A} - \varphi_{ref,B} \quad (19)$$

$$\varphi_{AM}(d_{AM}, \tilde{n}) = -2\pi f_c(\tilde{n})\frac{d_{AM}}{c} + \varphi_{lo,A}(\tilde{n}) - \varphi_{lo,M}(\tilde{n}) + \varphi_{b,A} - \varphi_{ref,M} \quad (20)$$

$$\varphi_{BA}(d_{AB}, \tilde{n}) \cong -2\pi f_c(\tilde{n})\frac{d_{AB}}{c} + \varphi_{lo,B}(\tilde{n}) - \varphi_{lo,A}(\tilde{n}) + \varphi_{b,B} - \varphi_{ref,A} \quad (21)$$

$$\varphi_{BM}(d_{BM}, \tilde{n}) \cong -2\pi f_c(\tilde{n})\frac{d_{AM}}{c} + \varphi_{lo,B}(\tilde{n}) - \varphi_{lo,M}(\tilde{n}) + \varphi_{b,B} - \varphi_{ref,M} \quad (22)$$

The mobile node can directly measure the phases according to (16), (18), (20), and (22) and can compute the following phase differences:

$$\Delta\varphi_{AM}(d_{AM}, n, k) = \varphi_{AM}(d_{AM}, \tilde{n}) - \varphi_{AM}(d_{AM}, n) \quad (23)$$

$$\Delta\varphi_{AM}(d_{AM}, n, k) = -2\pi df_h\frac{d_{AM}}{c} + \varphi_{lo,A}(\tilde{n}) - \varphi_{lo,M}(\tilde{n}) - \varphi_{lo,A}(n) + \varphi_{lo,M}(n)$$

$$\Delta\varphi_{BM}(d_{BM}, n, k) = \varphi_{BM}(d_{BM}, \tilde{n}) - \varphi_{BM}(d_{BM}, n) \quad (24)$$

$$\Delta\varphi_{BM}(d_{BM}, n, k) = -2\pi kf_h\frac{d_{BM}}{c} + \varphi_{lo,B}(\tilde{n}) - \varphi_{lo,M}(\tilde{n}) - \varphi_{lo,B}(n) + \varphi_{lo,M}(n)$$

Anchor node B can directly measure the phases according to (15) and (19), and may compute the following phase difference:

$$\Delta\varphi_{AB}(d_{AB}, n, k) = \varphi_{AB}(d_{AB}, \tilde{n}) - \varphi_{AB}(d_{AB}, n) \quad (25)$$

$$\Delta\varphi_{AB}(d_{AB}, n, k) = -2\pi kf_h\frac{d_{AB}}{c} + \varphi_{lo,A}(\tilde{n}) - \varphi_{lo,B}(\tilde{n}) - \varphi_{lo,A}(n) + \varphi_{lo,B}(n)$$

Anchor node A can directly measure the phases according to (17) and (21), and may compute the following phase difference:

$$\Delta\varphi_{BA}(d_{AB}, n, k) = \varphi_{BA}(d_{AB}, \tilde{n}) - \varphi_{BA}(d_{AB}, n) \quad (26)$$

$$\Delta\varphi_{BA}(d_{AB}, n, k) = -2\pi kf_h\frac{d_{AB}}{c} + \varphi_{lo,B}(\tilde{n}) - \varphi_{lo,A}(\tilde{n}) - \varphi_{lo,B}(n) + \varphi_{lo,A}(n)$$

With the equations above it is possible to get rid of the remaining unknown phases and compute a distance difference information. Using the intermediate results (27a)-(27c)

$$\Delta\varphi_{BM}(d_{BM}, n, k) - \Delta\varphi_{AM}(d_{AM}, n, k) = \quad (27a)$$

$$-2\pi kf_h\frac{d_{BM} - d_{AM}}{c} + \varphi_{lo,B}(\tilde{n}) - \varphi_{lo,A}(\tilde{n}) - \varphi_{lo,B}(n) + \varphi_{lo,A}(n)$$

$$\frac{1}{2}(\Delta\varphi_{BA}(d_{AB}, n, k) - \Delta\varphi_{AB}(d_{AB}, n, k)) = \quad (27b)$$

$$\varphi_{lo,B}(\tilde{n}) - \varphi_{lo,A}(\tilde{n}) - \varphi_{lo,B}(n) + \varphi_{lo,A}(n)$$

$$\Delta\varphi_{BA}(d_{AB}, n, k) + \Delta\varphi_{AB}(d_{AB}, n, k) = -4\pi kf_h\frac{d_{AB}}{c} \quad (27c)$$

the following solutions can be derived to compute the distance difference $\Delta d = d_{BM} - d_{AM}$.

Solution 1: Insert (27b) into (27a) and solve for $\Delta d$:

$$\Delta \varphi_{BM}(d_{BM}, n, k) - \Delta \varphi_{AM}(d_{AM}, n, k) = \qquad (28)$$

$$-2\pi k f_h \frac{\Delta d}{c} + \frac{1}{2}(\Delta \varphi_{BA}(d_{AB}, n, k) - \Delta \varphi_{AB}(d_{AB}, n, k))$$

$$\Delta d = -\frac{c}{4\pi k f_h}(2(\Delta \varphi_{BM}(d_{BM}, n, k) - \Delta \varphi_{AM}(d_{AM}, n, k)) +$$

$$\Delta \varphi_{AB}(d_{AB}, n, k) - \Delta \varphi_{BA}(d_{AB}, n, k))$$

Solution 1 requires knowledge of $\Delta \varphi_{AB}(d_{AB}, n, k)$ and $\Delta \varphi_{BA}(d_{AB}, n, k)$ (or the related phase measurements) at node M. Knowledge of $d_{AB}$ is not explicitly required.

Solution 2: Solve (27c) for $\Delta \varphi_{AB}(d_{AB}, n, k)$ and insert in (28):

$$\Delta d = \qquad (29)$$

$$-\frac{c}{2\pi k f_h}(\Delta \varphi_{BM}(d_{BM}, n, k) - \Delta \varphi_{AM}(d_{AM}, n, k) - \Delta \varphi_{BA}(d_{AB}, k)) + d_{AB}$$

Solution 2 requires knowledge of $d_{AB}$ and $\Delta \varphi_{BA}(d_{AB}, n, k)$ (or the related phase measurements) at node M.

Solution 3: Solve (27c) for $\Delta \varphi_{BA}(d_{AB}, n, k)$ and insert in (28):

$$\Delta d = \qquad (30)$$

$$-\frac{c}{2\pi k f_h}(\Delta \varphi_{BM}(d_{BM}, n, k) - \Delta \varphi_{AM}(d_{AM}, n, k) + \Delta \varphi_{AB}(d_{AB}, k)) - d_{AB}$$

Solution 3 requires knowledge of $d_{AB}$ and $\Delta \varphi_{AB}(d_{AB}, n, k)$ (or the related phase measurements) at node M.

Equations (28)-(30) represent an atomic measurement at two different frequency steps composed of one phase measurements per frequency step at node A and node B and two phase measurements per frequency step at node M.

In order to increase robustness against measurement noise, clock jitter, wireless channel distortions (e.g. multipath), and to reduce the amount of data that needs to be exchanged via messages, several atomic measurements can be averaged already at the node where the measurements are conducted. In another embodiment, averaging may be also applied by means of multiple measurements at the same frequencies n and n+k. Both averaging steps may be also combined. Assuming, that in total N frequency steps are evaluated ($n \in [1 \ldots N]$), it can be written $$\overline{\Delta \varphi}_{AM}(d_{AM}, k) = -2\pi k f_h \frac{d_{AM}}{c} + \qquad (23a)$$

$$\frac{1}{N-1} \sum_{n=1}^{N-1} (\varphi_{lo,A}(n+k) - \varphi_{lo,M}(n+k) - \varphi_{lo,A}(n) + \varphi_{lo,M}(n))$$

$$\overline{\Delta \varphi}_{BM}(d_{BM}, k) = -2\pi k f_h \frac{d_{BM}}{c} + \qquad (24a)$$

$$\frac{1}{N-1} \sum_{n=1}^{N-1} (\varphi_{lo,B}(n+k) - \varphi_{lo,M}(n+k) - \varphi_{lo,B}(n) + \varphi_{lo,M}(n))$$

$$\overline{\Delta \varphi}_{AB}(d_{AB}, k) = -2\pi k f_h \frac{d_{AB}}{c} + \qquad (25a)$$

$$\frac{1}{N-1} \sum_{n=1}^{N-1} (\varphi_{lo,A}(n+k) - \varphi_{lo,B}(n+k) - \varphi_{lo,A}(n) + \varphi_{lo,B}(n))$$

-continued $$\overline{\Delta \varphi}_{BA}(d_{AB}, k) = -2\pi k f_h \frac{d_{AB}}{c} + \qquad (26a)$$

$$\frac{1}{N-1} \sum_{n=1}^{N-1} (\varphi_{lo,B}(n+k) - \varphi_{lo,A}(n+k) - \varphi_{lo,B}(n) + \varphi_{lo,A}(n))$$

$$\overline{\Delta d} = \qquad (28a)$$

$$-\frac{c}{4\pi k f_h}\left(2(\overline{\Delta \varphi}_{BM}(d_{BM}, k) - \overline{\Delta \varphi}_{AM}, k)\right) + \overline{\Delta \varphi}_{AB}(d_{AB}, k) - \overline{\Delta \varphi}_{BA}(d_{AB}, k)\right)$$

$$\overline{\Delta d} = -\frac{c}{2\pi k f_h}(\overline{\Delta \varphi}_{BM}(d_{BM}, k) - \overline{\Delta \varphi}_{AM}(d_{AM}, k) - \overline{\Delta \varphi}_{BA}(d_{AB}, k)) + d_{AB} \qquad (29a)$$

$$\overline{\Delta d} = -\frac{c}{2\pi k f_h}(\overline{\Delta \varphi}_{BM}(d_{BM}, k) - \overline{\Delta \varphi}_{AM}(d_{AM}, k) + \overline{\Delta \varphi}_{AB}(d_{AB}, k)) - d_{AB} \qquad (30a)$$

Figure 8:
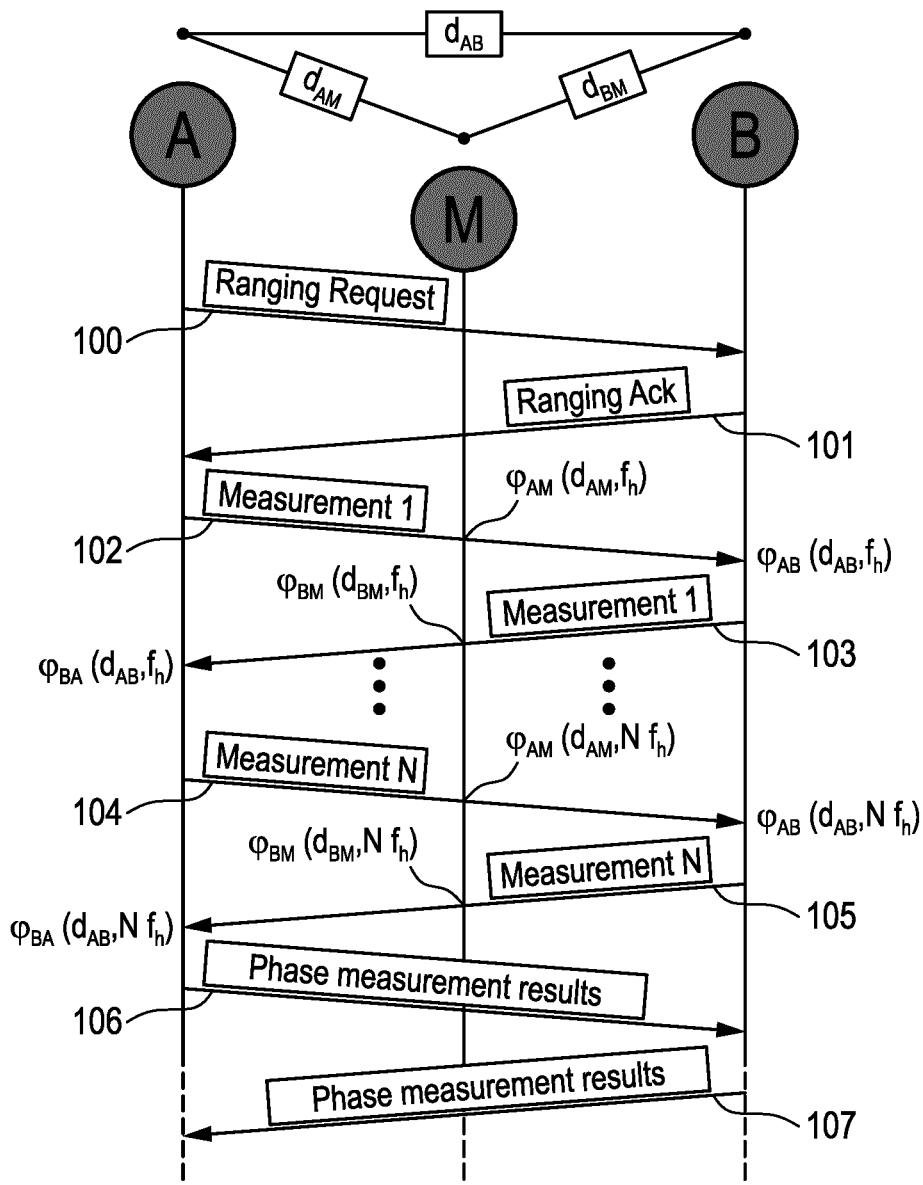
FIG. 8 shows a diagram illustrating an exemplary measurement procedure for the scalable phase difference ranging according to the present disclosure.

FIG. 8 shows a diagram illustrating an exemplary measurement procedure for the disclosed scalable phase difference ranging. The ranging starts with a ranging request message 100 from anchor node A (initiator/master), followed by an acknowledge message 101 from anchor node B. Mobile node M (representing the communication device according to the present disclosure) retrieves both exchanged messages (including relevant settings, e.g. negotiation of frequency hopping sequence) which allows node M to synchronize to the subsequent phase measurements. It shall be noted that instead of a request message an "announcement" may be used that instead of an acknowledge message a "response to announcement" may be used.

The first measurement signal transmission 102, 104 from node A at a given frequency step n is used to synchronize the local oscillators (phase-locked loop (PLL)) of node B and node M with respect to the received frequency $f_c$ and their local reference frequencies $f_{ref,B}$ and $f_{ref,M}$, respectively. After phase lock, the phases $\varphi_{AB}(d_{AB}, n)$ (representing a third phase) and $\varphi_{AM}(d_{AM}, n)$ (representing a first phase) are measured at node B and M, respectively. At the end of signal transmission from node A, the second step of two-way ranging is applied, i.e. the PLLs of node B and node M are opened to "freeze" the local oscillator frequencies and node B starts to transmits its measurement signal 103, 105. Node A and node M measure the phases $\varphi_{BA}(d_{AB}, n)$ (representing a fourth phase) and $\varphi_{BM}(d_{BM}, n)$ (representing a second phase), respectively. The two-way ranging at the given frequency step n is complete at the end of signal transmission by node B.

The two-way ranging procedure is executed at multiple or all defined/negotiated frequency steps $n \in [1 \ldots N]$. Finally, the phase information at node A and node B (representing third and fourth phase information derived from the third and fourth phases) is transmitted via messages 106, 107. The phase information may include the measured phases $\varphi_{AB}(d_{AB}, n)$ and $\varphi_{BA}(d_{AB}, n)$ or phase differences $\Delta \varphi_{AB}(d_{AB}, n)$ and $\Delta \varphi_{BA}(d_{BA}, n)$ obtained from the measured phases. Node M retrieves and evaluates the messages of node A and/or node B to estimate the distance difference $\Delta d$ according to (28)-(30) or (28a)-(30a). The distance difference may have a unique range that is proportional to the wavelength of the defined/negotiated frequency (e.g. ~12 cm at 2.4 GHz).

Node M should know (e.g. may be informed of) the measurement sequence (in particular frequency point sequence, multiple measurements at same frequency) between node A and node B. Node B should be aware of that sequence. This information may be exchanged during initialization of the communication between node A and node B such that node M is able to listen to this communication.

Figure 9:
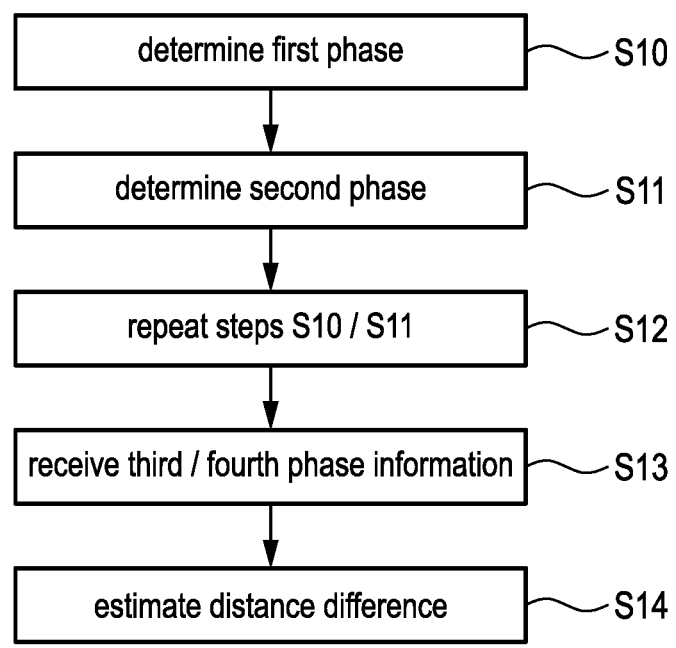
FIG. 9 shows a flow chart of an embodiment of a communication method according to the present disclosure.
Figure 10A:
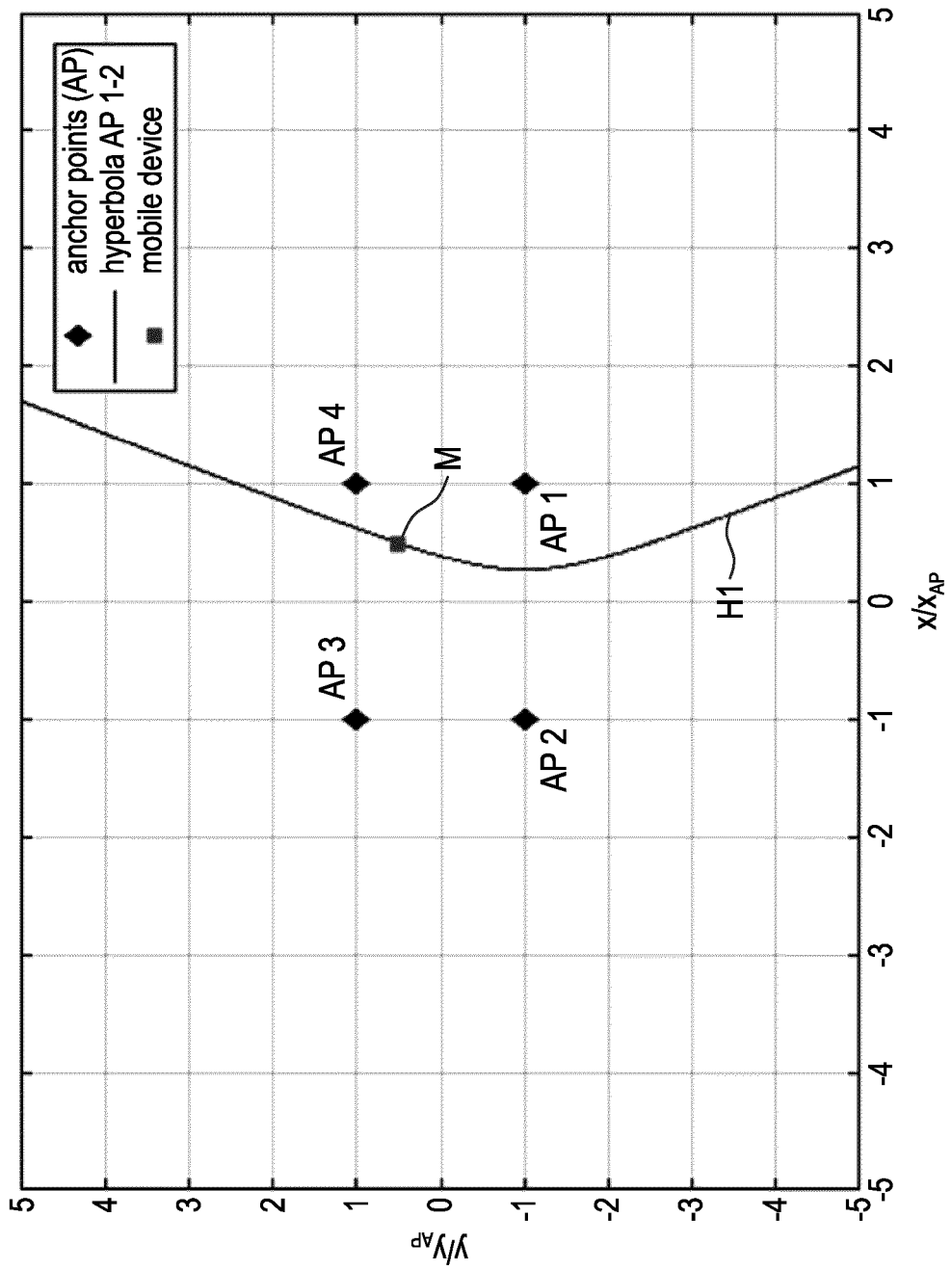
FIGS. 10A-10D show diagrams illustrating hyperbolic positioning using different numbers of hyperbolas from different numbers of node pairs.
Figure 10B:
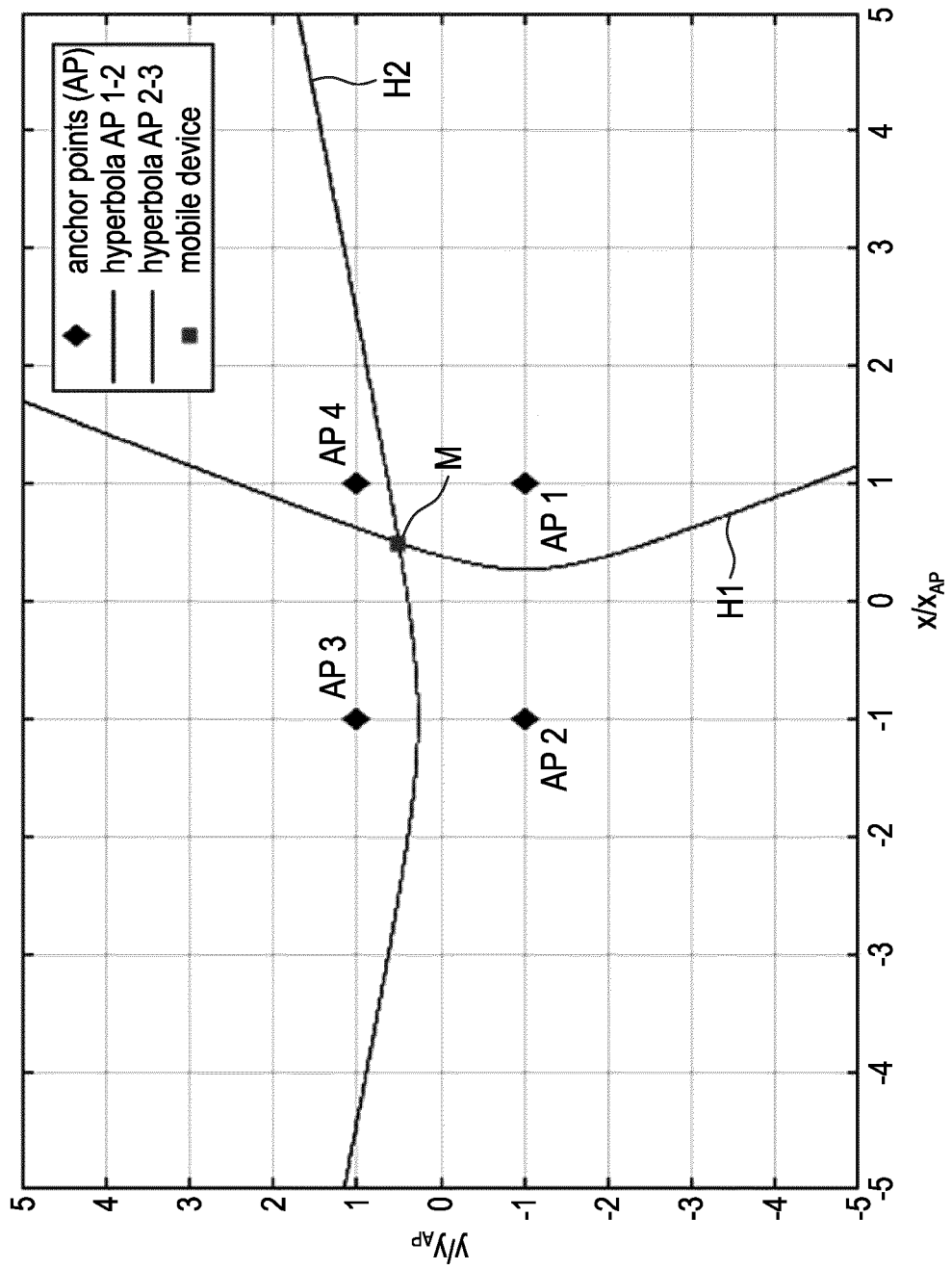
Figure 10C:
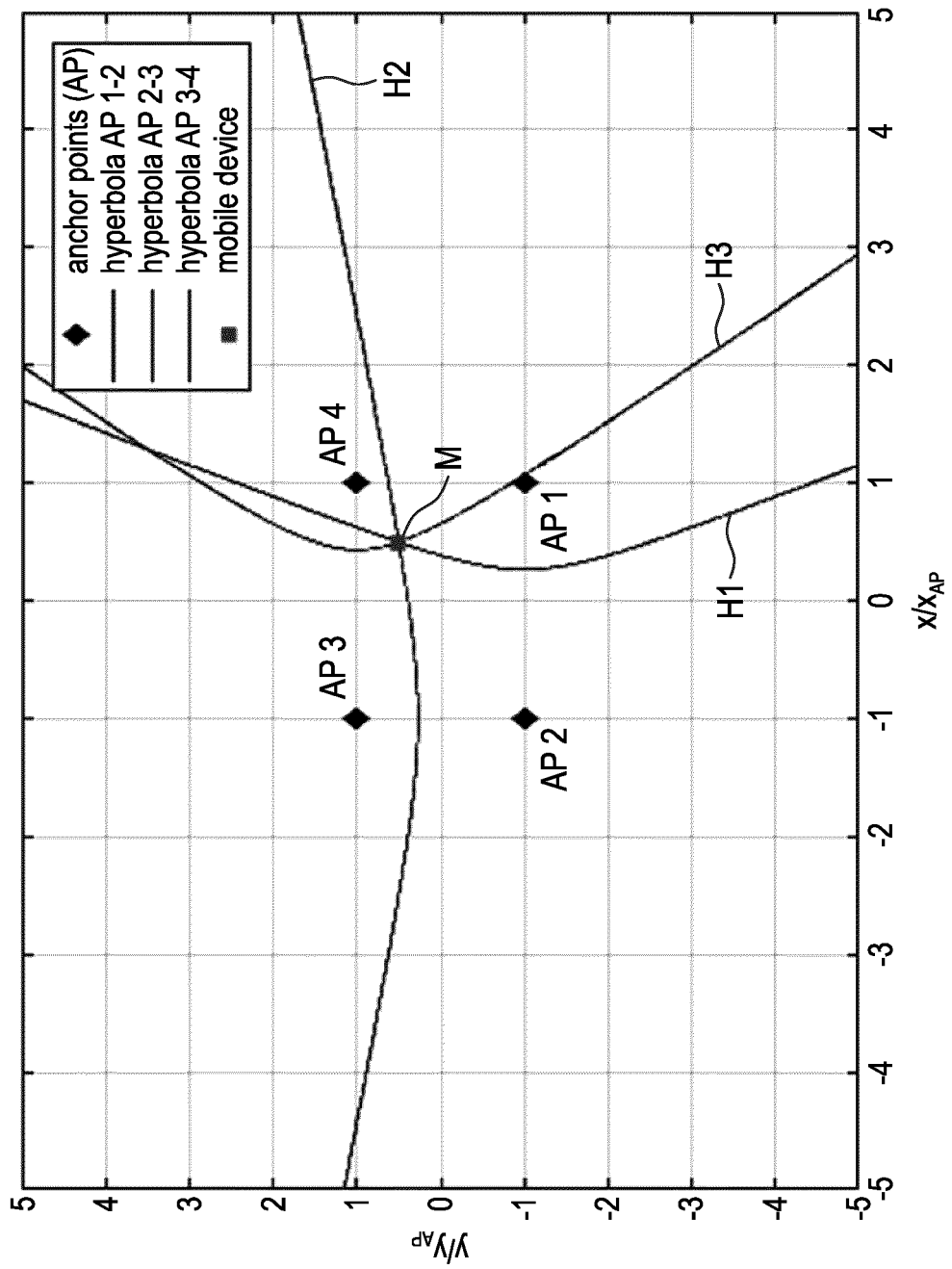
Figure 10D:
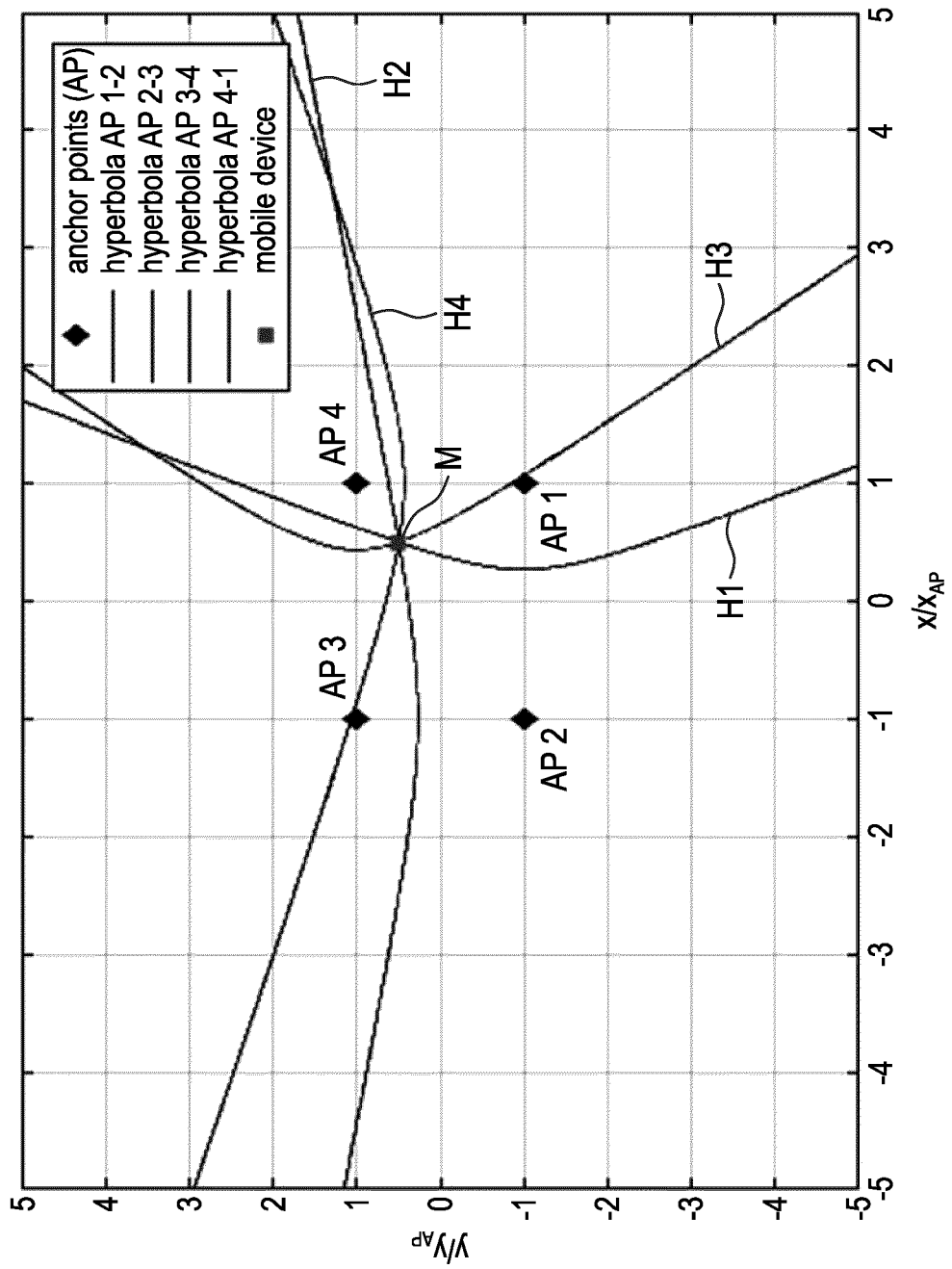

FIG. 9 shows a flow chart of an embodiment of a communication method according to the present disclosure.

The steps of this method substantially comprises the steps carried out by the node M in the scalable phase difference ranging illustrated in FIG. 8.

In a first step S10 a first phase of a first measurement signal transmitted by a first node to a second node is measured. In a second step S11 a second phase of a second measurement signal transmitted by the second node to the first node is measured. The measurements of the first and second phases may be repeated one or more times (step S12).

In step S13 phase information is received from the first node and/or the second node. The phase information includes third phase information acquired by the second node from measurements of a third phase of the first measurement signals and/or fourth phase information acquired by the first node from measurements of a fourth phase of the second measurement signals. In step S14 a distance difference is estimated using the measured first and second phases and the received phase information. The distance difference represents the difference between a first distance between the communication device and the first node and a second distance between the communication device and the second node.

Various modifications of the disclosed method are possible.

In an embodiment, the measurement procedure may be initiated by node M by sending a request for ranging/positioning. Based on this request node A sends a ranging request to node B to start the measurement procedure. An advantage is that node A and node B may perform the measurement procedure only in case of a node M request and thus anchor nodes installed in a building need to be active only in the surrounding area of node M during a limited amount of time. This way energy can be saved and interference to other systems operating in the same frequency band can be minimized.

In another embodiment, the two-way ranging may be extended to M-way ranging. For example, 3-way ranging may consist of the measurement signal transmission sequence "Node A→Node B→Node A" while keeping all PLLs in open loop (oscillator frequency freeze) mode after initial synchronization of node B and node M during the first transmission of node A. In case of 4-way ranging the sequence may be extended to "Node A→Node B→Node A→Node B", and so on. An advantage is that 2-way ranging only allows to compute one phase difference whereas 3-way ranging already allows to compute at least two independent phase differences, 4-way ranging yields at least three independent phase differences, etc. The additional phase difference information can be used to improve the ranging accuracy, e.g. averaging of the phase differences may be applied to reduce the variance of the ranging result.

In another embodiment, the sequence of the measurement procedure may be modified, e.g. phase measurement results may be exchanged after every M-way ranging. Consequently, intermediate results are available at an early point in time and the mobile node could stop listening (or even sending a stop request) as soon as sufficient accuracy of Δd is reached.

In another embodiment, node A and node B may exchange their role. Further, in an embodiment, node M may be an anchor node that uses the ranging to evaluate/calibrate its own position with respect to the position of node A and node B.

In another embodiment, the phase differences according to (25) and (26) or average values according to (25a) and (26a) may be computed at nodes A and B, respectively, and only the result may be exchanged via messages that are retrievable by node M.

In another embodiment, node B may exchange the measured phase (difference) information with node A in an encrypted manner such that node M is not able to directly retrieve this information. Node A may modify the information before it sends it via a message that can be retrieved by node M.

In another embodiment, the phase (difference) information may be also exchanged using other frequency bands and/or other communication standards and/or physical media (wired/wireless).

Assuming that the anchor node distance $d_{AB}$ is known, (27c) may be used in an embodiment to estimate oscillator drift between node A and node B. For this purpose, measurements at different time instants with fixed n and k may be evaluated, e.g. by means of M-way ranging with M≥2.

The distance difference information determined in an embodiment of the present disclosure corresponds to a hyperbolic function. Ranging with more than one anchor node pair yields more hyperbolic functions which ideally intersect in one unique point. With measurement uncertainty, the estimation of the position turns into a non-linear problem. Solutions to this problem are generally known and for example described in F. Gustafsson et. al. (Linköping University), Positioning using time-difference of arrival measurements, ICASSP 2003. A method for positioning based on time difference measurements is described in WO 2016/207297 A1.

FIGS. 10A-10D show diagrams illustrating hyperbolic positioning using different numbers of hyperbolas from different numbers of node pairs. In these exemplary diagrams it is assumed that there are 4 anchor points AP1-AP4 and 1 mobile device M, whose position is to be determined. According to FIG. 10A a single node pair is used resulting in a single hyperbola H1. According to FIG. 10B two node pairs are used resulting in two hyperbolas H1 and H2, whose intersection indicates the position of the mobile device M. According to FIG. 10C three node pairs are used resulting in three hyperbolas H1, H2 and H3, whose intersection indicates the position of the mobile device M. According to FIG. 10D four node pairs are used resulting in four hyperbolas H1-H4, whose intersection indicates the position of the mobile device M. Generally, any number of nodes (at least three are preferred) and any number of node pairs (at two are preferred) may be used to unambiguously determine the position of the mobile device M.

The absolute position information of the nodes may be used to obtain the position and orientation of the hyperbolas in space. The common crossing point of all hyperbolas then directly indicates the absolute position of the mobile device (in the defined coordinate system). Other information may be used as well to compute the (absolute and/or relative) position of the node M. Such information may include information from other measurement modalities (e.g. measurements of the strength of the electric and/or magnetic field), other positioning information (e.g. from a local sensor) or communication between the nodes.

The disclosed approach is generally not limited to I/Q transceivers as shown in FIGS. 1, 3, 5 and 6 for the purpose of illustration and basic mathematical proof.

A time critical part in the phase difference ranging procedure is the phase drift between the local oscillators of the involved nodes. Therefore, the M-way measurement duration at a given frequency step n should be kept sufficiently small. The measurement across a certain frequency band is less time critical. Limiting factors are the phase drift between the local reference and baseband signals of the involved nodes and change of the mobile node's position over time. These facts are already considered in the measurement procedure described above.

If applicable for the anchor nodes, beamforming may be applied to limit the area a mobile node may listen to the two-way ranging between anchor node pairs. For example, this allows to better confine the area in which scalable phase difference ranging is possible and hence also confine the interference to other communication systems to this area.

Mobile nodes with known position (e.g. estimated a short time span ago or have shown to remain at a fixed position for a certain amount of time) may be temporarily considered as anchor nodes to improve the position estimate for other mobile nodes.

The above-described solution 1 does not require knowledge of $d_{AB}$. This fact may be used for position/) calibration of anchor nodes based on a few known positions of one (or several) mobile node(s) or based on known positions of already installed and calibrated anchor nodes.

FIG. 10 shows a flow chart of an embodiment of a communication method according to the present disclosure. In a first step S10 a first phase of a first measurement signal transmitted by a first node to a second node is measured. In a second step S11 a second phase of a second measurement signal transmitted by the second node to the first node is measured. The measurements of the first and second phases may be repeated one or more times (step S12).

In step S13 phase information is received from the first node and/or the second node. The phase information includes third phase information acquired by the second node from measurements of a third phase of the first measurement signals and/or fourth phase information acquired by the first node from measurements of a fourth phase of the second measurement signals. In step S14 a distance difference is estimated using the measured first and second phases and the received phase information. The distance difference represents the difference between a first distance between the communication device and the first node and a second distance between the communication device and the second node.

The present disclosure allows positioning and tracking of a practically unlimited number of mobile nodes and a controllable amount of data exchanges (i.e. more efficient use of spectrum resources for positioning). Privacy may be guaranteed since a mobile node is only listening and all computations can be executed on a mobile node. Further, the present disclosure it requires less power consumption in the mobile node as it just needs to listen to the communication of the anchor nodes. On the other hand, the anchor nodes installed at the premises can be easily equipped with larger batteries or a connection to an external energy source.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Communication device comprising circuitry configured to:
   measure a first phase of a first measurement signal transmitted by a first node to a second node,
   measure a second phase of a second measurement signal transmitted by the second node to the first node,
   repeat the measurements of the first and second phases one or more times,
   receive phase information from the first node and/or the second node, said phase information including third phase information acquired by the second node from measurements of a third phase of the first measurement signals and/or fourth phase information acquired by the first node from measurements of a fourth phase of the second measurement signals, and
   estimate a distance difference using the measured first and second phases and the received phase information, said distance difference representing the difference between a first distance between the communication device and the first node and a second distance between the communication device and the second node.

2. Communication device according to any preceding embodiment,
   wherein the circuitry comprises phase locked loop circuitry that is configured to lock to the first measurement signal transmitted by the first node before the first phase is measured and to freeze the phase locked loop circuitry before the transmission of the first measurement signal of the first node stops.

3. Communication device according to embodiment 2,
   wherein the circuitry is configured to carry out the second phase measurement without explicit locking to the second node and to continue to run the phase locked loop circuitry in freeze mode.

4. Communication device according to any preceding embodiment,
wherein the circuitry is configured to
perform further measurements of further first and second phases of further measurement signals between the first and/or second node and one or more further nodes and/or between one or more further pairs of nodes,
receive further phase information from one or more of the first node, the second node and/or the one or more further nodes,
estimate one or more further distance differences using the further measurements of further first and second phases and the further phase information, and
estimate the distance between the communication device and one or more of said nodes from the estimated distance difference and the estimated one or more further distance differences.

5. Communication device according to any one of embodiments 2 to 4,
wherein the circuitry is configured to estimate the distance by use of hyperbolic positioning determining the intersection between hyperbolic functions, each being defined by a different estimated distance difference and the position of the first and second nodes.

6. Communication device according to any preceding embodiment,
wherein the circuitry is configured to estimate the position of the communication device using the position of the first and/or second node and the estimated distance difference and/or using several estimations of the distance difference performed over time.

7. Communication device according to any preceding embodiment,
wherein the circuitry is configured to estimate the distance difference using the measured first and second phases, the distance between the first node and the second node and one of the received third phase information or the received fourth phase information.

8. Communication device according to any preceding embodiment,
wherein the circuitry is configured to
determine a first phase difference from subsequent measurements of the first phase,
determine a second phase difference from subsequent measurements of the second phase, and
estimate the distance difference using the first and second phase differences and the received phase information.

9. Communication device according to any preceding embodiment,
wherein the third phase information includes a third phase difference determined from subsequent measurements of the third phase and a fourth phase difference determined from subsequent measurements of the fourth phase.

10. Communication device according to any preceding embodiment,
wherein the third phase information includes subsequent measurement of the third phase and/or the fourth phase and
the circuitry is configured to determine a third phase difference from subsequent measurements of the third phase and/or to determine a fourth phase difference from subsequent measurements of the fourth phase.

11. Communication device according to any preceding embodiment,
wherein the circuitry is configured to use average values of the measured first phases and/or of the measured second phases and/or of the third phase information and/or of the fourth phase information to estimate the distance difference.

12. Communication device according to any preceding embodiment,
wherein the circuitry comprises phase locked loop circuitry and oscillator circuitry configured to switch between a first mode and a second mode, wherein in the first mode the oscillator circuitry is locked with respect to the received first measurement signal and in the second mode the oscillator circuitry is locked with respect to the received second measurement signal.

13. Communication device according to embodiment 12,
wherein the circuitry is configured to measure further first and second phases while the phase locked loop circuitry is kept in freeze state and to determine further first and/or second phase differences from the further measurements of the first and second phases.

14. Communication device according to any preceding embodiment,
wherein the circuitry is configured to
receive a ranging request message from the first node or the second node and a ranging acknowledgement message from the other one of the first node and the second node, and
retrieve ranging information based on the received ranging request message and/or the received ranging acknowledgement message.

15. Communication device according to any preceding embodiment,
wherein the circuitry is configured to transmit a ranging request message and/or to receive the phase information after each repetition or a number of repetitions of the measurement of the first phase and the second phase.

16. Communication device according to any preceding embodiment,
wherein the circuitry is configured to receive the phase information in encrypted form and/or in another frequency band than the measurement signals and/or using another communication standard than used for transmitting the measurement signals and/or using another physical reception medium.

17. Communication device according to any preceding embodiment,
wherein the circuitry is configured to estimate oscillator drift between the first node and the second node based on the first and second measurement signals and to use the estimated oscillator drift to control an oscillator frequency of oscillator circuitry.

18. Communication device according to any preceding embodiment,
wherein the circuitry is configured to perform the repeated measurements at different frequencies and/or to perform the repeated measurements at the same frequency and average the repeated measurements.

19. Communication device according to any preceding embodiment,
wherein the circuitry is configured to measure at least at two different neighboring frequencies to extend the unique distance estimation range and/or to measure at different frequencies in a communication band to mitigate multipath effects.

20. Communication method comprising:
  measuring a first phase of a first measurement signal transmitted by a first node to a second node,
  measuring a second phase of a second measurement signal transmitted by the second node to the first node,
  repeating the measurements of the first and second phases one or more times,
  receiving phase information from the first node and/or the second node, said phase information including third phase information acquired by the second node from measurements of a third phase of the first measurement signals and/or fourth phase information acquired by the first node from measurements of a fourth phase of the second measurement signals, and
  estimating a distance difference using the measured first and second phases and the received phase information, said distance difference representing the difference between a first distance between the communication device and the first node and a second distance between the communication device and the second node.

21. Non-transitory computer-readable recording medium that stores therein a computer program product, which, when executed by a processor, causes the following steps to be performed:
  obtaining a first phase of a first measurement signal transmitted by a first node to a second node,
  obtaining a second phase of a second measurement signal transmitted by the second node to the first node,
  obtaining further first and second phases from repeated measurements of the first and second phases one or more times,
  receiving phase information from the first node and/or the second node, said phase information including third phase information acquired by the second node from measurements of a third phase of the first measurement signals and/or fourth phase information acquired by the first node from measurements of a fourth phase of the second measurement signals, and
  estimating a distance difference using the measured first and second phases and the received phase information, said distance difference representing the difference between a first distance between the communication device and the first node and a second distance between the communication device and the second node.

22. A computer program comprising program code means for causing a computer to perform the following steps when said computer program is carried out on a computer:
  obtaining a first phase of a first measurement signal transmitted by a first node to a second node,
  obtaining a second phase of a second measurement signal transmitted by the second node to the first node,
  obtaining further first and second phases from repeated measurements of the first and second phases one or more times,
  receiving phase information from the first node and/or the second node, said phase information including third phase information acquired by the second node from measurements of a third phase of the first measurement signals and/or fourth phase information acquired by the first node from measurements of a fourth phase of the second measurement signals, and
  estimating a distance difference using the measured first and second phases and the received phase information, said distance difference representing the difference between a first distance between the communication device and the first node and a second distance between the communication device and the second node.

The invention claimed is:

1. A communication device comprising circuitry configured to:
  measure a first phase of a first measurement signal transmitted by a first node to a second node,
  measure a second phase of a second measurement signal transmitted by the second node to the first node,
  repeat the measurements of the first and second phases one or more times,
  receive phase information from the first node and/or the second node, said phase information including third phase information acquired by the second node from measurements of a third phase of the first measurement signals and/or fourth phase information acquired by the first node from measurements of a fourth phase of the second measurement signals, and
  estimate a distance difference using the measured first and second phases and the received phase information, said distance difference representing the difference between a first distance between the communication device and the first node and a second distance between the communication device and the second node.

2. The communication device according to claim 1, wherein the circuitry comprises phase locked loop circuitry that is configured to lock to the first measurement signal transmitted by the first node before the first phase is measured and to freeze the phase locked loop circuitry before the transmission of the first measurement signal of the first node stops.

3. The communication device according to claim 2, wherein the circuitry is configured to carry out the second phase measurement without explicit locking to the second node and to continue to run the phase locked loop circuitry in freeze mode.

4. The communication device according to claim 1, wherein the circuitry is configured to
  perform further measurements of further first and second phases of further measurement signals between the first and/or second node and one or more further nodes and/or between one or more further pairs of nodes,
  receive further phase information from one or more of the first node, the second node and/or the one or more further nodes,
  estimate one or more further distance differences using the further measurements of further first and second phases and the further phase information, and
  estimate the distance between the communication device and one or more of said nodes from the estimated distance difference and the estimated one or more further distance differences.

5. The communication device according to claim 2, wherein the circuitry is configured to estimate the distance by use of hyperbolic positioning determining the intersection between hyperbolic functions, each being defined by a different estimated distance difference and the position of the first and second nodes.

6. The communication device according to claim 1, wherein the circuitry is configured to estimate the position of the communication device using the position of the first and/or second node and the estimated distance difference and/or using several estimations of the distance difference performed over time.

7. The communication device according to claim 1, wherein the circuitry is configured to estimate the distance difference using the measured first and second phases, the distance between the first node and the second node and one of the received third phase information or the received fourth phase information.

8. The communication device according to claim 1, wherein the circuitry is configured to
determine a first phase difference from subsequent measurements of the first phase,
determine a second phase difference from subsequent measurements of the second phase, and
estimate the distance difference using the first and second phase differences and the received phase information.

9. The communication device according to claim 1, wherein the third phase information includes a third phase difference determined from subsequent measurements of the third phase and a fourth phase difference determined from subsequent measurements of the fourth phase.

10. The communication device according to claim 1,
wherein the third phase information includes subsequent measurement of the third phase and/or the fourth phase, and
the circuitry is configured to determine a third phase difference from subsequent measurements of the third phase and/or to determine a fourth phase difference from subsequent measurements of the fourth phase.

11. The communication device according to claim 1, wherein the circuitry is configured to use average values of the measured first phases and/or of the measured second phases and/or of the third phase information and/or of the fourth phase information to estimate the distance difference.

12. The communication device according to claim 1, wherein the circuitry comprises phase locked loop circuitry and oscillator circuitry configured to switch between a first mode and a second mode, and in the first mode the oscillator circuitry is locked with respect to the received first measurement signal and in the second mode the oscillator circuitry is locked with respect to the received second measurement signal.

13. The communication device according to claim 12, wherein the circuitry is configured to measure further first and second phases while the phase locked loop circuitry is kept in freeze state and to determine further first and/or second phase differences from the further measurements of the first and second phases.

14. The communication device according to claim 1, wherein the circuitry is configured to
receive a ranging request message from the first node or the second node and a ranging acknowledgement message from the other one of the first node and the second node, and
retrieve ranging information based on the received ranging request message and/or the received ranging acknowledgement message.

15. The communication device according to claim 1, wherein the circuitry is configured to transmit a ranging request message and/or to receive the phase information after each repetition or a number of repetitions of the measurement of the first phase and the second phase.

16. The communication device according to claim 1, wherein the circuitry is configured to receive the phase information in encrypted form and/or in another frequency band than the measurement signals and/or using another communication standard than used for transmitting the measurement signals and/or using another physical reception medium.

17. The communication device according to claim 1, wherein the circuitry is configured to estimate oscillator drift between the first node and the second node based on the first and second measurement signals and to use the estimated oscillator drift to control an oscillator frequency of oscillator circuitry.

18. The communication device according to claim 1, wherein the circuitry is configured to perform the repeated measurements at different frequencies and/or to perform the repeated measurements at the same frequency and average the repeated measurements.

19. A communication method performing by a communication device, the communication method comprising:
measuring a first phase of a first measurement signal transmitted by a first node to a second node,
measuring a second phase of a second measurement signal transmitted by the second node to the first node,
repeating the measurements of the first and second phases one or more times,
receiving phase information from the first node and/or the second node, said phase information including third phase information acquired by the second node from measurements of a third phase of the first measurement signals and/or fourth phase information acquired by the first node from measurements of a fourth phase of the second measurement signals, and
estimating a distance difference using the measured first and second phases and the received phase information, said distance difference representing the difference between a first distance between the communication device and the first node and a second distance between the communication device and the second node.

20. A non-transitory computer-readable recording medium that stores therein a computer program product, which, when executed by a processor of a communication device, causes the communication device to perform a method comprising:
measuring a first phase of a first measurement signal transmitted by a first node to a second node,
measuring a second phase of a second measurement signal transmitted by the second node to the first node,
obtaining further first and second phases from repeated measurements of the first and second phases one or more times,
receiving phase information from the first node and/or the second node, said phase information including third phase information acquired by the second node from measurements of a third phase of the first measurement signals and/or fourth phase information acquired by the first node from measurements of a fourth phase of the second measurement signals, and
estimating a distance difference using the measured first and second phases and the received phase information, said distance difference representing the difference between a first distance between the communication device and the first node and a second distance between the communication device and the second node.

* * * * *